United States Patent Office 3,443,123
Patented May 6, 1969

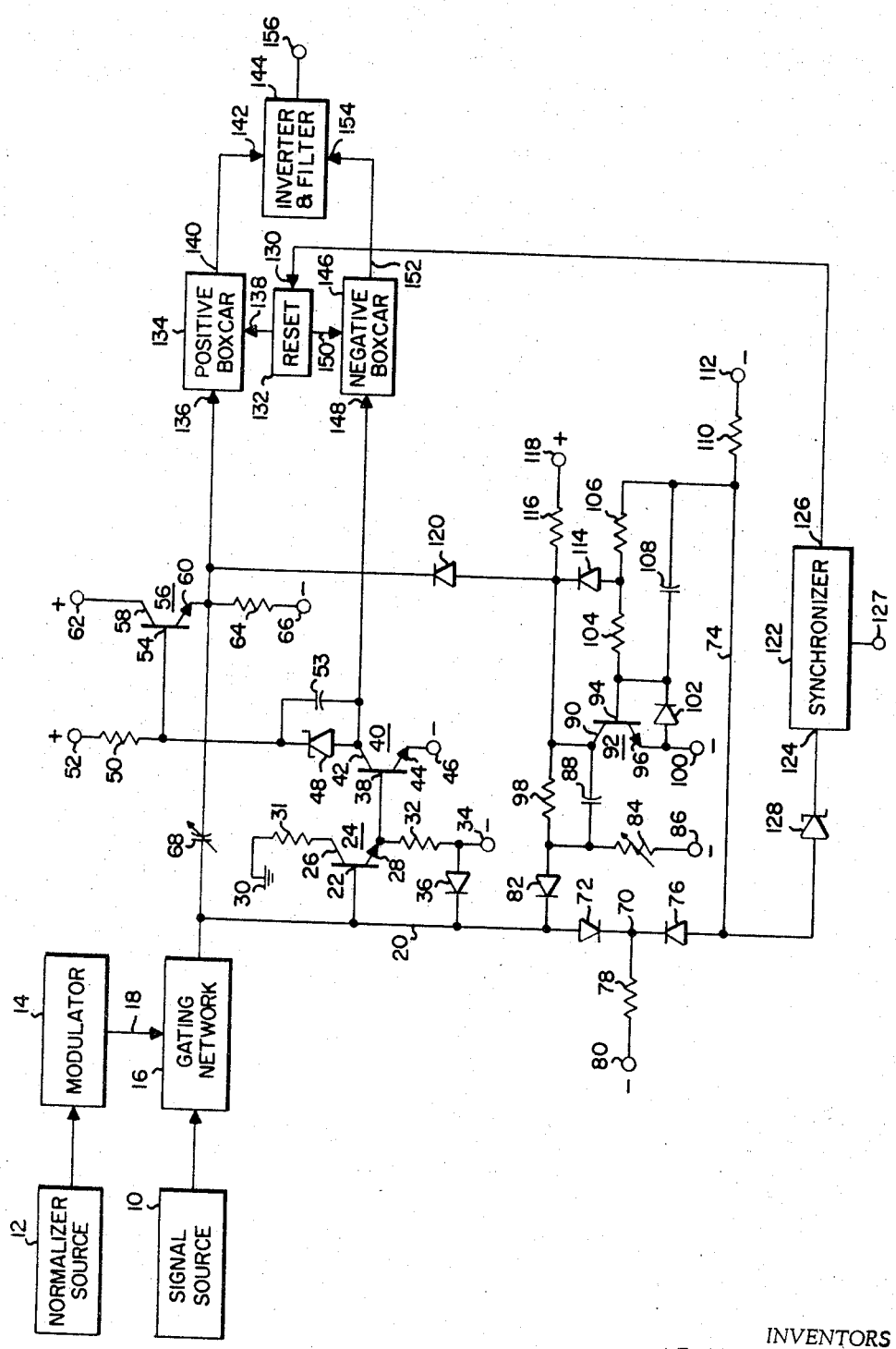

3,443,123
APPARATUS FOR NORMALIZING A PHASE OR ANGLE RADAR INFORMATION SIGNAL TO REMOVE AMPLITUDE VARIATIONS
Warren L. Leyde, Seattle, and John E. Osterhaug, Edmonds, Wash., and Leland T. Thomasson, Arlington, Mass., assignors to Honeywell, Inc., Minneapolis, Minn., a corporation of Delaware
Filed June 21, 1965, Ser. No. 465,630
Int. Cl. H03k 5/20, 1/14
U.S. Cl. 307—232                                    6 Claims

ABSTRACT OF THE DISCLOSURE

A normalizer which normalizes a signal with a reference signal is disclosed wherein the signal is divided by the reference signal in a pulse modulator and gating network and the pulse representation is integrated and filtered.

This invention generally pertains to gain control apparatus in electrical circuits and more specifically to automatic gain control in radar receivers.

In a radar receiver or other monopulse receiver, it is possible to determine the relative angle between the antenna boresight and the radar target by inspecting the phase of transmitted and received pulses. However, when the received signal strength is rapidly changing, noise-like errors are introduced in the angle output information which indicate an erroneous relative angle. Rapid acting AGC can do much to alleviate the errors introduced by the rapidly changing received signal strength, however, even with AGC significant errors remain. This invention provides apparatus for further reducing the effect of such errors.

In the operation of this invention a reference signal is used to normalize or adjust the signal level of an information signal. The reference signal contains the amplitude variations of the information signal, however, it does not contain the phase or angle information. By normalizing or dividing the information signal with the reference signal, the amplitude variations are cancelled so that the output angle or phase information is independent of received signal amplitude variations. In other words, the output signal is of constant amplitude for a constant angle or phase irrespective of variations in the received signal strength.

In accordance with this invention, a first input signal containing phase or relative angle information is divided by a reference input signal that is independent of the phase or relative angle. This division is performed by first converting the reference signal in a pulse duration modulator to provide modulated pulses that are of a duration inversely proportional to the reference signal voltage, and second using these pulses to activate a gating network, which when activated passes the information signal. The output of the gating network is a series of pulses of an amplitude proportional to the information signal and of a duration proportional to the modulated signal or inversely proportional to the reference signal amplitude. To recover the angle information from the output pulses of the gating network, the pulses are integrated to provide generally sawtooth waveforms of an amplitude indicative of the amplitude and duration of the output pulses from the gating network. A feedback or clamping network is also provided such that the output of the integrator is returned to a reference level in the interval between each of the input pulses to the integrator. Upon the occurrence of an input pulse, the feedback network is disabled to free the integrator so that its output can change in voltage. The output signal from the integrator is converted to boxcar waveforms of an amplitude indicative of the fully integrated amplitude of the input pulses to the integrator. The boxcar waveforms are then filtered to provide a generally DC output signal indicative of the sense and amplitude of the relative angle information.

It is an object of this invention, therefore, to eliminate errors from relative angle information in a radar receiver or similar monopulse system.

It is a further object of this invention to eliminate errors in relative angle information by normalizing the input signal with a reference signal.

These and other objects of this invention will become apparent to those skilled in the art upon a reading of this specification and the appended claims in conjunction with the accompanying drawing.

The single figure is a schematic and block diagram representation of one embodiment of this invention.

Referring now to the figure, there is shown a first input means or signal source 10 and a second input means, reference source, or normalizer source 12. The output of normalizer source 12 is connected to the input of a modulator or converter 14. The output of modulator 14 is connected to a multiplying means or gating network 16 by means of a conductor 18. The output of gating network 16 is connected to a conductor 20. The modulator 14 and gating network 16 may be considered a modulator means, dividing means, combining means, or normalizing means.

Conductor 20 is connected to an input means, control means, or base means 22 of a current control means or NPN transistor means 24, which further has a collector means 26 and an output means or emitter means 28. Collector means 26 is connected through a resistor 31 to a common conductor or ground 30. Emitter 28 is connected through a resistor 32 to a source of negative energizing potential 34. Diode means 36 is connected between conductor 20 and source 34 such that the negative voltage swing of conductor 20 is limited. Emitter 28 of transistor 24 is connected to an input means, control means, or base means 38 of a current control means or NPN transistor means 40. Transistor 40 further has an output means or collector means 42 and an emitter means 44. Emitter 44 is connected to a source of negative energizing potential 46 and collector 42 is connected through a series combination of a voltage limiting means of Zener diode 48 and a resistor 50 to a source of positive energizing potential 52. A capacitor 53 is connected in parallel across Zener diode 48 which is polarized such that when transistor 40 is conducting it will be operating in reverse breakdown. The junction point between Zener diode 48 and resistor 50 is connected to an input means, control means, or base means 54 of a current control means or NPN transistor means 56. Transistor 56 further has a collector means 58 and an output means or emitter means 60. Collector 58 is connected to a source of positive energizing potential 62 and emitter 60 is connected through a resistor 64 to a source of negative energizing potential 66. Emitter 60 is further connected by means of a variable capacitance means 68 to conductor 20. Transistors 24, 40, and 56 and capacitor 68 along with their associated circuitry comprise an integrating means to integrate output signals from gating network 16. While NPN transistors are shown in the specific embodiment, PNP transistors could be used as well with accompanying changes in the polarities of the potential sources.

Conductor 20 is further connected to a junction point 70 by means of a diode 72. Junction point 70 is also connected to a conductor 74 by means of a diode 76. Diodes 72 and 76 are polarized so that their easy direction of current flow is toward junction point 70. Junction point 70 is connected through a resistor 78 to a source of negative energizing potential 80.

Conductor 20 is connected to a cathode of a diode 82, the anode of which is connected through a variable resistive means 84 to a source of negative energizing potential 86. A junction point between diode 82 and resistor 84 is connected by means of a capacitor 88 to an output means or collector means 90 of a current control means, switch means, or NPN transistor means 92. Transistor 92 further has an input means, control means, or base means 94 and an emitter means 96. A resistor 98 is connected in parallel with capacitor 88. Emitter 96 of transistor 92 is connected to a source of negative energizing potential 100 and is further connected by means of a diode 102 to the base 94. Diode 102 is polarized to limit the negative voltage swing of base 94. Base 94 of transistor 92 is further connected by means of a serial combination of resistors 104 and 106 to conductor 74 and further by a capacitor 108 to conductor 74. Conductor 74 is connected through a resistor 110 to a source of negative energizing potential 112. A junction point between resistors 104 and 106 is connected to the anode of a diode 114, the cathode of which is connected to collector 90 of transistor 92. Collector 90 of transistor 92 is connected through a resistor 116 to a source of positive energizing potential 118 and is also connected to the anode of a diode 120, the cathode of which is connected to emitter 60 of transistor 56.

There is shown a control means or synchronizer means 122 having output terminals 124 and 126. Output terminal 124 is connected to a cathode of a Zener diode 128, the anode of which is connected to conductor 74. Output terminals 126 is connected to an input terminal 130 of a reset means 132.

A positive boxcar 134 has an input terminal 136 connected to emitter 60 of transistor 56 and an input terminal 138 connected to an output terminal of reset 132. Positive boxcar 134 further has an ouput terminal 140 connected to an input terminal 142 of an inverter and filter 144. A negtaive boxcar 146 has an input terminal 148 connected to collector 42 of transistor 40 and an input terminal 150 connected to an output terminal of reset 132. Negative boxcar 146 further has an output terminal 152 connected to an input terminal 154 of inverter and filter 144. Inverter and filter 144 has an output terminal 156.

Transistor 92, diode 120, diode 82, diode 72, diode 76, and synchronizer 122 and their associate circuitry comprise a feedback means and disabling means or control means, the operation of which will be described hereinafter. Positive boxcar 134, negative boxcar 146, reset means 132, inverter and filter 144, and synchronizer 122 and their associtaed circuitry comprise a waveform converting means or means for sampling the peak output of output signals from the integrator.

To understand the operation of this invention, first assume that no input signals are being applied. Conductor 20 will be held sufficiently positive with respect to source 34 so that transistor 24 will be biased in an active region or ON. Current will flow from common conductor 30 through resistor 31, transistor 24, and resistor 32 to the negative supply 34. The current flowing through resistor 32 will raise the potential of base 38 of transistor 40 above the potential of emitter 44 of transistor 40 so that transistor 40 will be based ON or in an active region. Current will flow from positive source 52 through resistor 50, capacitor 53, and transistor 40 to the negative source 46. Capacitor 53 will charge to the reverse breakdown voltage of Zener diode 48 to establish a voltage differential equal to the breakdown voltage of the Zener diode 48 between collector 42 of transistor 40 and base 54 of transistor 56. Transistor 56 will be biased ON or in an active region and current will flow from positive source 62 through transistor 56 and resistor 64 to negative source 66.

When there is input signal from gating network 16, there will be no output signal from synchronizer 122. Current will flow from source 118 through resistor 116, the parallel combination of resistor 98 and capacitor 88, diode 82, diode 72, and resistor 78 to negative source 80. The current flowing through resistor 78 operating in conjunction wtih negative source 112 will keep diode 76 reverse biased. Part of the current flowing through this path will be tapped off through resistor 84 to negative source 86. Current will also flow from positive source 118 through resistor 116, diode 120, and resistor 64 to negative source 66. The current flowing through diode 82 establishes a current flow toward the base 22 of transistor 24 and the current flowing through diode 72 establishes a current flow away from base 22 of transistor 24. The potential of conductor 20 is also regulated by negative source 46 and the base to emitter volt drops of transistors 24 and 40. Thus, a feedback path is established from emitter 60 of transistor 56 to base 22 of transistor 24. By varying the resistance of the variable resistor 84, the amount of feedback current to base 22 of transistor 24 can be controlled so that in the absence of input signals emitter 60 of transistor 56 is established at approximately zero volts or ground potential. In the absence of an output signal from synchronizer 122, transistor 92 is OFF or non-conducting due to negative source 112. This operation can be referred to as "zero clamping" and the feedback loop as the zero clamping loop because the output signal at emitter 60 of transistor 56 is clamped to zero volts or ground potential. During zero clamping, collector 42 of transistor 40 is also held at a substantially constant potential.

Now assume that an input signal of amplitude $V_d$ is present at the output of signal source 10 and that an input signal or reference signal $V_s$ is present at the output of normalizer source 12. $V_d$ contains relative angle information which may be erroneous due to rapidly changing received signal amplitude. Approximately the same amplitude variations that cause the erroneous angle indication will be contained by the output signal from the normalizer source 12. Modulator 14 will provide output pulses on conductor 18 that are inversely proportional in width to the amplitude of input signal $V_s$. If T is the duration of the signal on conductor 18, $T=K/V_s$. The pulses on conductor 18 activate the gating network so that the output from the gating network is proportional to the amplitude of $V_d$ and of a duration T. The total energy content of the output pulses from gating network 16 is $T \times V_d$ or proportional to $V_d/V_s$. The constant of proportionality K is irrelevant because it can be compensated for in the remaining circuitry. The signal present on conductor 20 is then a normalized signal indicative of $V_d/V_s$.

Synchronizer 122 is synchronized with the signal present on conductor 20 so that output pulses occur at outputs 124 and 126 of synchronizer 122 upon the occurrence of input signals on conductor 20. The positive output pulse at output 124 causes Zener diode 128 to conduct, forward biases diode 76, and reverse biases diode 72. Diode 82 also becomes reverse biased due to the input signal on conductor 20 and the action of source 86. The output pulse from synchronizer 122 also switches transistor 92 to an ON or conducting condition so that collector 90 is lowered in potential. When collector 90 of transistor 92 is lowered in potential, diode 120 will become reverse biased to deactivate the feedback loop. Transistor 92 and diode 76 working in cooperation with synchronizer 122 disable or deactivate the feedback loop and permit the integrator to integrate by removing the constraint on the potential of emitter 60 of transistor 56.

A positive input pulse on conductor 20 causes transistor 24 to conduct more current thereby raising the potential of emitter 28 of transistor 24 and hence the potential of base 38 of transistor 40. The rise in potential of base 38 of transistor 40 increases the conduction of transistor 40 and lowers the potential of collector 42 and hence the potential of base 54 of transistor 56. The decrease in potential of base 54 causes the conduction of transistor 56 to decrease thereby decreasing the potential of emitter 60. The decrease in potential of emitter 60 of transistor 56 is fed back through capacitor 68 to conductor 20 in a typical integrator type feedback. Negative-going sawtooth waveforms are generated at the collector 42 of transistor 40 and at the emitter 60 of transistor 56. The slope of the sawtooth is controlled by the capacitance of capacitor 68. The maximum amplitude reached by the sawtooth waveforms is indicative of the amplitude and duration of the output pulses from gating network 16.

If the output signal from signal source 10 is negative, the output signal from gating network 16 is also negative. The negative input to the base 22 of transistor 24 decreases the conduction of transistor 24 thereby decreasing the potential of emitter 28 of transistor 24 and hence base 38 of transistor 40. When the potential of base 38 decreases, the conduction of transistor 40 will decrease thereby raising the potential of collector 42 of transistor 40 and hence base 54 of transistor 56. The increase in potential of base 54 will cause an increase in conduction through transistor 56 and raise the potential of emitter 60. Thus, positive-going sawtooth waveforms are generated at collector 42 of transistor 40 and emitter 60 of transistor 56 in response to negative input signals.

At the end of the integrating period or output pulse from gating network 16, the output pulse from synchronizer 122 ends and the feedback or zero clamping loop is activated by switching transistor 92 OFF. The feedback loop returns the potential of emitter 60 of transistor 56 to zero volts or the reference potential.

Coincident with the leading edge of the output pulse from gating network 16, the synchronizer 122 provides an output pulse at output 126 to activate reset 132. The reset output pulses reset the positive boxcar 134 and the negative boxcar 146. At the end of a normalizer gate period, the integrating period, or output pulse from gating network 16, the boxcars 134 and 146 read the voltage that, at that instant, appears on the emitter 60 of transistor 56 and the collector 42 of transistor 40. The positive and negative boxcars 134 and 146 provides a mutually exclusive DC output voltage equal to the peak amplitude of the sawtooth waveform output signals from the integrator and hold this DC level until they are reset for the next integrating period. Isolating means or diodes are provided in boxcars 134 and 146 so that only the positive boxcar 134 has an output with a negative input pulse on conductor 20 and only the negative boxcar 146 has an output with a positive input pulse on conductor 20. Inverter and filter 144 receives the output voltage from positive boxcar 134 and from negative boxcar 146 to provide a generally DC or slowly varying output signal indicative of the sense and magnitude or amplitude of the relative angle information. Inverter and filter 144 may be a Miller operational amplifier modified for this purpose. Reset 132, positive boxcar 134, negative boxcar 146, and inverter and filter 144 may generally be considered an output means, sampling means, or waveform converting means.

While a specific embodiment has been shown and described and a specific use for the specific embodiment has been discussed, it is to be understood that many variations of this invention will be obvious to those skilled in the art and uses other than in a radar receiver will be obvious. We intend to be limited only by the scope of the appended claims.

We claim:

1. Apparatus for reducing errors in an input signal comprising, in combination:

input means for providing an information signal including an amplitude component;

means for supplying a reference signal;

means for pulse width modulating said reference signal connected to said means for supplying a reference signal, said means for modulating said reference signal supplying output pulses of a duration inversely proportional to the amplitude of said reference signal;

gating means connected to said input means and to the output of said modulating means, said gating means providing an output pulse signal of an amplitude proportional to said input signal and of a duration equal to said output pulses of said modulating means;

integrating means connected to said gating means to receive said output pulse signal, said integrating means providing integrated output signals indicative of the amplitude and duration of each of the pulses of said output pulse signal; and means for converting said integrated output signals to a signal indicative of the sense and amplitude of said integrated output signals at the end of an integrating interval of said integrating means.

2. Apparatus for reducing errors in a radar receiver comprising, in combination:

first input means for supplying a first input signal containing relative angle information;

second input means for supplying a second input signal;

modulator means connected to said second input means to receive said second input signal, said modulator means providing a modulated output signal of pulses of a duration inversely related to the amplitude of said second input signal;

gating means connected to said modulator means and further connected to said first input means whereby said modulated output signal activates said gating means to pass said first input signal, said gating means thereby providing an output signal indicative of said first input signal divided by said second input signal;

first, second, and third transistor means each having control means and output means;

means connecting said control means of said first transistor means to said gating means and said output means of said first transistor means to said control means of said second transistor means;

voltage limiting means connecting said output means of said second transistor means to said control means of said third transistor means whereby a predetermined potential difference is established between said output means of said second transistor means and said control means of said third transistor means;

feedback capacitive means connected between said output means of said third transistor means and said control means of said first transistor means, the combination providing an integrating means for integrating said output signal from said gating means, said integrating means providing a first output signal at said output means of said second transistor means and a second output signal at said output means of said third transistor means;

first, second, third, and fourth diode means;

first, second, third, and fourth negative sources of energizing potential;

a positive source of energizing potential;

means connecting said first diode means between said positive source and said output means of said third transistor means whereby current flows from said positive source to said output means;

means connecting said second diode means between said positive source and said control means of said first transistor means whereby current flows from said positive source to said control means;

means connecting said third diode means between said control means of said first transistor means and said first negative source whereby current flows from said control means to said first negative source;

means connecting said fourth diode means between said first and second negative sources;

variable resistive means connected between said second
diode means and said third negative source whereby
the current to said control means of said first transistor means is balanced to hold the potential of
said output means of said third transistor means substantially at ground potential;

fourth transistor means having a control means, said
fourth transistor means connected between said first
diode means and said fourth negative source;

means connecting said control means of said fourth
transistor means to said second negative source so
that said fourth transistor means is normally nonconducting;

synchronizer means having first and second output
means, said first output means being connected to
said fourth diode means and to said control means
of said fourth transistor means whereby said synchronizer means produces output pulses when said
output signal from said gating means occurs, said
output pulses operating to forward bias said fourth
diode means and switch said fourth transistor means
to a conducting condition thereby reverse biasing
said first and said third diode means to permit said
integrating means to integrate said output signal
from said gating means;

first and second boxcar circuit means connected to said
output means of said second transistor means and
said third transistor means, respectively;

means connecting said second output means of said
synchronizer means to said first and second boxcar
circuit means to receive a reset signal from said synchronizer means whereby said first and second boxcar circuit means are reset at the end of each integrating period of said integrating means; and means connected to said first and second boxcar circuit means to means to convert the output waveforms
of said boxcar circuit means to a voltage indicative
of the sense and amplitude of said relative angle information.

3. Apparatus of the class described comprising, in combination:

first and second input signal means;

modulating means connected to said second input signal
means to provide modulated output pulses of a width
inversely proportional to a signal from said second
input signal means;

gating means connected to said first input signal means
and to said modulating means, said gating means
operative to produce output signals of an amplitude indicative of a signal from said first input
signal means and of a duration indicative of said
modulated output signals;

first, second, and third transistor means and variable
capacitive means connected to provide an integrating
means having an input means connected to said
first transistor means and further connected to said
gating means, first output means connected to said
second transistor means, and second output means
connected to said third transistor means;

means including feedback means connected between
said second output means of said integrating means
and said input means of said integrating means, said
feedback means operative to clamp the potential
of said second output means to ground potential;

control means synchronized with said output signals
of said gating means, said control means providing
first and second synchronized output signals;

means including fourth transistor means and diode
means connected to said control means and said
feedback means and operable to disable said feedback means in response to said first synchronized
output signal;

first waveform converting means connected to said
first output means of said integrating means;

second waveform converting means connected to said
second output means of said integrating means;

reset means connected to said control means to receive said second synchronized output signal and
further connected to said first and second waveform
converting means to provide signals to said first and
second waveform converting means whereby said
first and second waveform converting means sample
the voltage on said first and second output means,
respectively, of said integrating means at the end of
an integrating period and provide a constant output
signal indicative of the sampled voltage until the
next sample, said first and second waveform converting means including isolating diode means so
that said first waveform converting means provides
an output signal in response to positive polarity output signals from said gating means and said second
waveform converting means provides an output signal in response to negative polarity output signals
from said gating means; and means connected to said first and second waveform
converting means to convert said output signals from
said first and second waveform converting means to
an output signal indicative of the sense and amplitude of a characteristic of said first and second input
signals.

4. Apparatus of the class described comprising, in combination:

first and second input means, said first input means
providing a first input signal containing relative
angle information and said second input means
providing a second input signal;

modulating means connected to said second input
means, and operative to provide pulses of a width
inversely related to the amplitude of said second
input signal;

multiplying means connected to said first input means
and to said modulating means, said multiplying
means providing an output signal of pulses of amplitude proportional to said first input signal and of
a width inversely proportional to said second input
signal;

integrating means having first and second output means
and input means, said input means being connected
to said multiplying means to receive said output
signal from said multiplying means, said integrating
means providing first and second sawtooth output
signals at said first and second output means in response to rectangular input pulses;

means including feedback means connected between
said first output means of said integrating means
and said input means of said integrating means, said
feedback means having first, second, third, and
fourth current paths, said fourth current path including means for adjusting the current flow therethrough, the combination of current paths balancing
the current flow to said input means of said integrating means to hold said first output means at a substantially constant potential;

control means synchronized with said output signal of
said multiplying means so that said control means
provides output signals upon the occurrence of a
signal from said multiplying means;

means for disabling said feedback means connected to
said control means and to said feedback means to
disable said feedback means in response to said output signals from said control means;

converting means connected to said integrating means
to receive said first and second output signals therefrom, said converting means providing a first output signal in response to positive input pulses at
said input means of said integrating means and a
second output signal in response to negative input
pulses at said input means of said integrating means;

means for connecting said converting means to said control means to receive a reset signal from said control means whereby said reset signal resets said converting means to read said output signals from said integrating means at the end of an integrating period; and means connected to said converting means to receive said first and second output signals therefrom and operable to produce an output signal indicative of the sense and magnitude of said relative angle information.

5. Apparatus of the class described comprising, in combination:

first input means for providing an information signal including an amplitude component; second input means for providing a reference signal; pulse width modulating means connected to said second input means for providing a pulse signal having a duration inversely proportional to the amplitude of said reference signal;

gating means connected to said pulse width modulating means and to said first input means for providing an output signal of pulses having a pulse duration equal to the duration of the pulse signal from said pulse width modulating means and an amplitude proportional to the amplitude of said information signal;

said pulse width modulating means and said gating means comprising a normalizing means;

integrating means connected to said normalizing means to receive said output signal;

converting means connected to said integrating means to convert output signals from said integrating means to a signal indicative of the sense and magnitude of a characteristic of said first input signal; and feedback means connected to said integrating means to return said integrating means to a starting output voltage between each of said output pulse signals from said normalizing means.

6. Apparatus for reducing errors in relative angle information comprising, in combination:

first input means for providing an information signal including an amplitude component representing relative angle information;

second input means for providing a reference signal;

pulse width modulating means connected to said second input means for providing a signal having a duration inversely proportional to the amplitude of said reference signal;

gating means connected to said pulse width modulating means and to said first input means for providing an output signal of pulses having a pulse duration equal to the duration of the pulse signal from said pulse width modulating means and an amplitude proportional to the amplitude of said information signal, said pulse width modulating means and said gating means comprising a normalizing means;

means for converting said output signal of pulses to a signal indicative of the sense and magnitude of the relative angle information connected to said normalizing means and comprising an integrating means connected to said normalizing means to receive said output signal of pulses, means for sampling integrated output signals connected to said integrating means to receive integrated output signals therefrom, said means for sampling integrated output signals providing an output signal indicative of the peak amplitude and the sense of said integrated output signals, and a feedback means connected to said integrating means, said feedback means operative to return the output voltage of said integrating means to a reference potential in the interval between pusles of said output signal from said means for normalizing a first input signal.

References Cited

UNITED STATES PATENTS

| | | | |
|---|---|---|---|
| 3,119,029 | 1/1964 | Russell | 307—88.5 |
| 3,200,338 | 8/1965 | Ellis | 328—127 |
| 3,246,247 | 4/1966 | Grindle | 328—127 |
| 3,251,058 | 5/1966 | Sutcliffe | 328—127 |
| 3,274,514 | 9/1966 | Foulger | 328—58 |
| 3,320,434 | 5/1967 | Ott | 307—88.5 |
| 2,578,256 | 1951 | MacNichol | 328—127 |
| 3,064,144 | 1962 | Hardy | 328—127 |
| 3,268,824 | 8/1966 | Hinrichs | 328—127 |

OTHER REFERENCES

"Box Integrator with long holding times," by R. J. Blume, The Review of Scientific Instrument, September 1961, pages 1016–1018.

ARTHUR GAUSS, *Primary Examiner.*

H. DIXON, *Assistant Examiner.*

U.S. Cl. X.R.

307—236, 265; 328—128